UNITED STATES PATENT OFFICE.

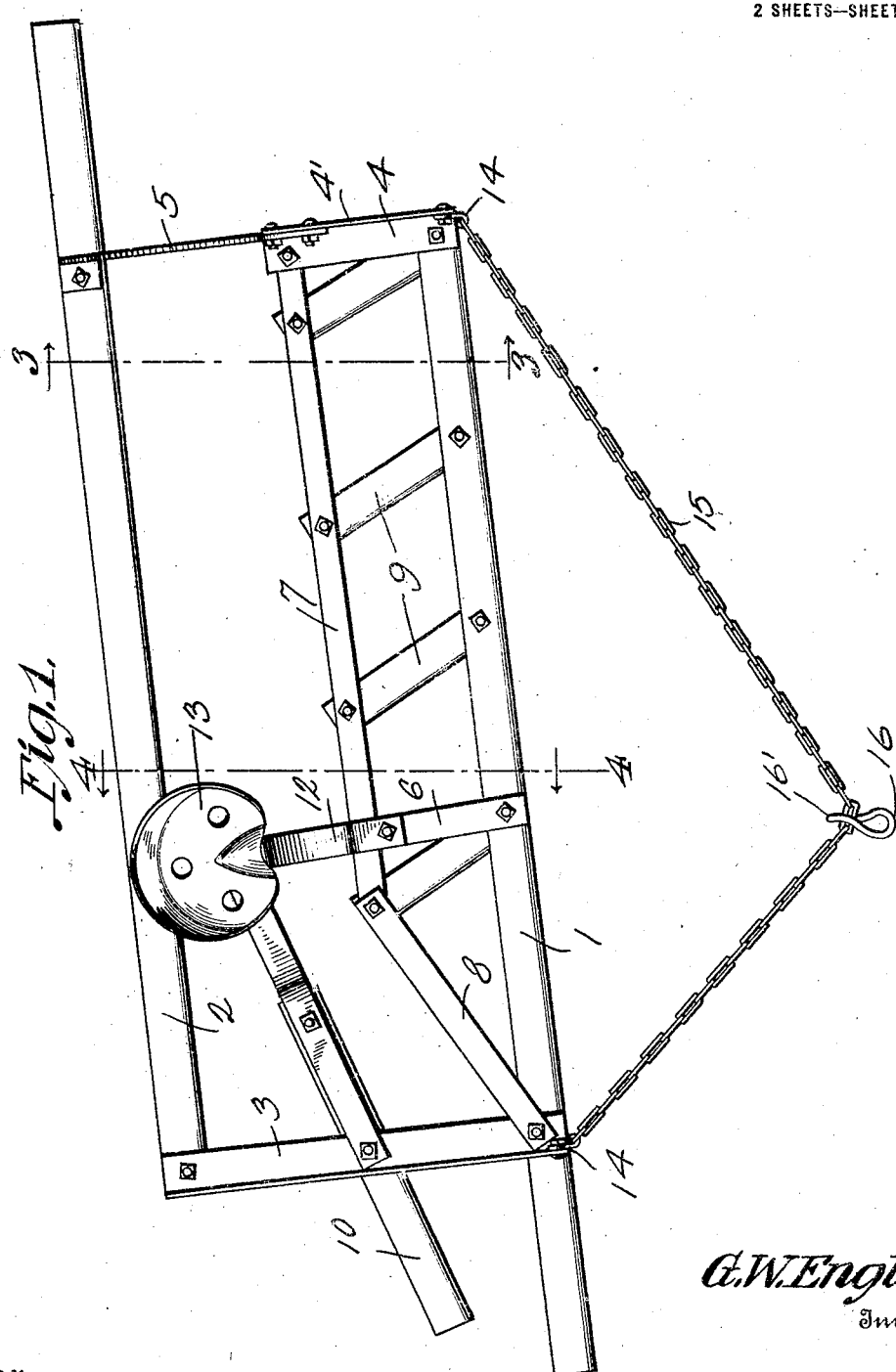

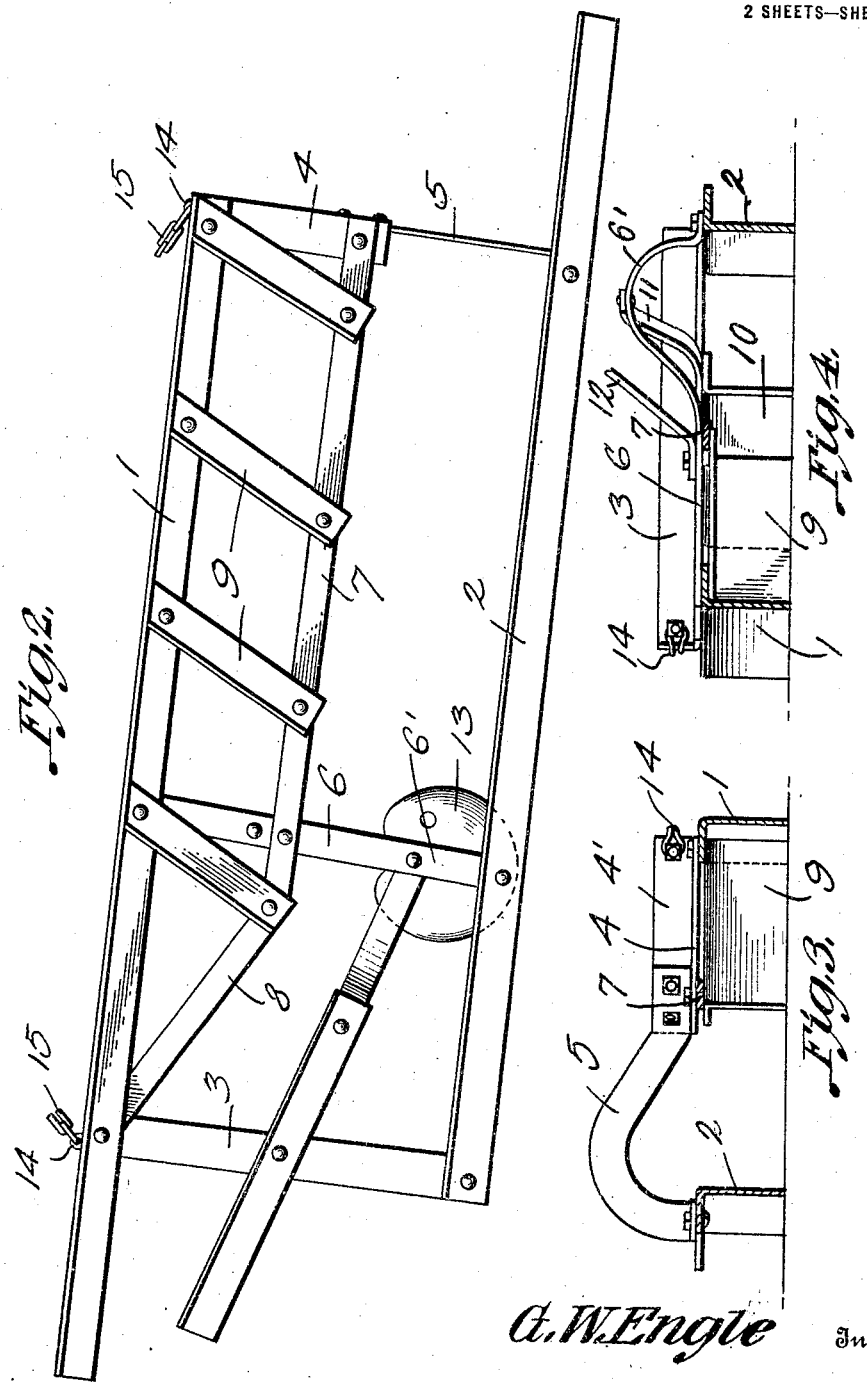

GEORGE WILLIAM ENGLE, OF CANTON, SOUTH DAKOTA.

ROAD-DRAG.

1,234,645.　　　　　Specification of Letters Patent.　　Patented July 24, 1917.

Application filed April 23, 1917. Serial No. 163,973.

*To all whom it may concern:*

Be it known that I, GEORGE WILLIAM ENGLE, a citizen of the United States, residing at Canton, in the county of Lincoln and State of South Dakota, have invented a new and useful Road-Drag, of which the following is a specification.

The subject of this invention is a road drag wherein transverse scraper bars coöperate with auxiliary scraper bars arranged at an angle thereto.

The main object of the invention is to provide a drag which will move the earth back and forth across the path of travel to distribute it evenly.

Another object is to provide a drag with main transverse bars operating to remove earth from the high spots and deposit the same in the depressions, the excess earth being directed toward the center of the road, and auxiliary bars coöperating therewith and moving the loose soil in a direction away from the center of the road.

Another object is to provide an auxiliary scraper bar, coöperating with the main scraper bars to direct the soil away from the edge of the road and toward the center thereof.

Another object is to provide means for preventing the scraper slipping sidewise.

Another object is to provide novel means for adjusting the draft of a drag.

Still another object is to provide a simple, cheap and efficient structure of the character described.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

One practical embodiment of the invention is shown in the accompanying drawings, wherein:—

Figure 1 is a plan view of the device.

Fig. 2 is a bottom plan view.

Fig. 3 is a vertical section taken on the line 3—3 of Fig. 1.

Fig. 4 is a vertical section taken on the line 4—4 of Fig. 1.

Referring to the drawings by numerals:—

A front scraper bar 1, and a rear scraper bar 2, each preferably formed of angle iron, are provided, and are arranged parallel and spaced apart. A tie beam 3 rests upon the bars 1 and 2, and has its forward end secured to a median point of the bar 1, and its rear end secured to one end of the bar 2. Another tie beam is provided for the bars 1 and 2, which is composed of two sections. The forward section 4 is formed of angle iron and has its forward end secured to one end of the bar 1, while to the upstanding web 4' thereof is fastened, at the rear end, one end of an upwardly curved arm 5, the other end of which is secured to a median point of the bar 2. From the foregoing it will be seen that the bars 1 and 2 are offset with respect to each other. Another tie beam 6, lying between the beam 3 and the sectional tie beam, connects the bars 1 and 2, and is preferably formed with an upwardly curved portion 6' adjacent its rear end.

An auxiliary beam 7 is arranged parallel with the bars 1 and 2, and is secured, at one end, to the rear end of the section 4 of the sectional tie beam, and also secured, at a median point adjacent its other end, to the tie beam 6. A diagonally positioned connecting beam 8 has one end secured to the other end of the beam 7, and its other end secured to the forward end of the tie beam 3. The scraper bar 1, section 4, beam 7, and connecting beam 8, form a frame for supporting the spaced parallel auxiliary scraper bars 9. The auxiliary bars 9 are arranged at an angle to the bar 1, and extend backwardly and outwardly therefrom, with their front ends secured to the bar 1, and their rear ends secured to the beam 7.

Secured, near its center, to the beam 3, and underlying the same, is an auxiliary scraper bar 10, the inner end of which may be secured to and supported by a bent rod 11, one end of which is secured to the upwardly curved portion 6' of the beam 6. The bar 10 is spaced from and positioned at an angle to the bar 1, and slopes backwardly and inwardly therefrom.

A resilient seat support 12 may be secured to the beam 6, from which it rises, and supports, at its upper end, a seat 13.

Lugs 14 are secured to the forward end of the tie beam 3 and the beam section 4 to which may be secured the ends of a chain 15. A connecting loop 16 is provided on the chain 15, which is formed with a mashed or contracted portion 16', the strands of the loop, in this mashed or contracted portion 16' being practically parallel and spaced apart a sufficient distance to permit a link of the chain 15 to be inserted edgewise therebetween. The portion 16' is twisted to lie in a plane at right angles to the plane of the main portion 16 of the loop. This forms a quick adjustment of the draft rigging so as to permit the angle of inclination of the drag to be quickly changed.

In use, the drag is drawn along the road in the usual manner, the bar 1 removing earth from the high spots, and depositing it in the depressions. The bar 1 also, because of its inclination, directs the earth toward the center of the road. The auxiliary bars 9 will tend to move earth toward the edge of the road but, as their operative edges are on a level with the operative edge of the bar 1, their function is a smoothing one rather than an absolute transportation and distribution of quantities of earth. The auxiliary bar 10 acts to distribute those particles of earth which have a tendency to slide or roll toward the edge of the road. These bars, because of their inclination, also act to prevent the drag from slipping toward the side of the road, which the drag has a tendency to do because of the grade of the road.

Having described my invention, what I claim as new and desire to secure by Letters Patent, is:—

1. A road drag, comprising scraper bars, beams connecting the bars, auxiliary scraper bars secured between the first mentioned bars and inclined in a direction opposite to the inclination of said first mentioned bars, and an auxiliary scraper bar at one end of the drag and inclined in a direction opposite to the direction of inclination of the first mentioned auxiliary bars.

2. A road drag, comprising a front and rear scraper bar sloping rearwardly, the front bar extending beyond the rear bar outwardly, and the rear bar extending beyond the front bar inwardly, a scraper bar lying behind the outer end of the front bar and inclined to direct earth toward a median point on the rear bar, beams connecting the bars and a series of auxiliary bars extending rearwardly from and secured to the front bar.

In testimony that I claim the foregoing as my own, I have hereto affixed my signature in the presence of two witnesses.

GEORGE WILLIAM ENGLE.

Witnesses:
Asa Forrest,
F. A. E. Goodroad.

Copies of this patent may be obtained for five cents each, by addressing the "Commissioner of Patents, Washington, D. C."